Dec. 26, 1939.　　　　C. M. EASON　　　　2,184,506
CLUTCH
Filed March 25, 1937　　　3 Sheets-Sheet 1

Inventor
Clarence M. Eason
By Brown, Jackson, Boettcher + Dienner
Attys

Dec. 26, 1939.  C. M. EASON  2,184,506
CLUTCH
Filed March 25, 1937   3 Sheets-Sheet 2

Inventor
Clarence M. Eason
By Brown, Jackson, Boettcher & Dienner
Attys

Dec. 26, 1939.   C. M. EASON   2,184,506
CLUTCH
Filed March 25, 1937   3 Sheets-Sheet 3
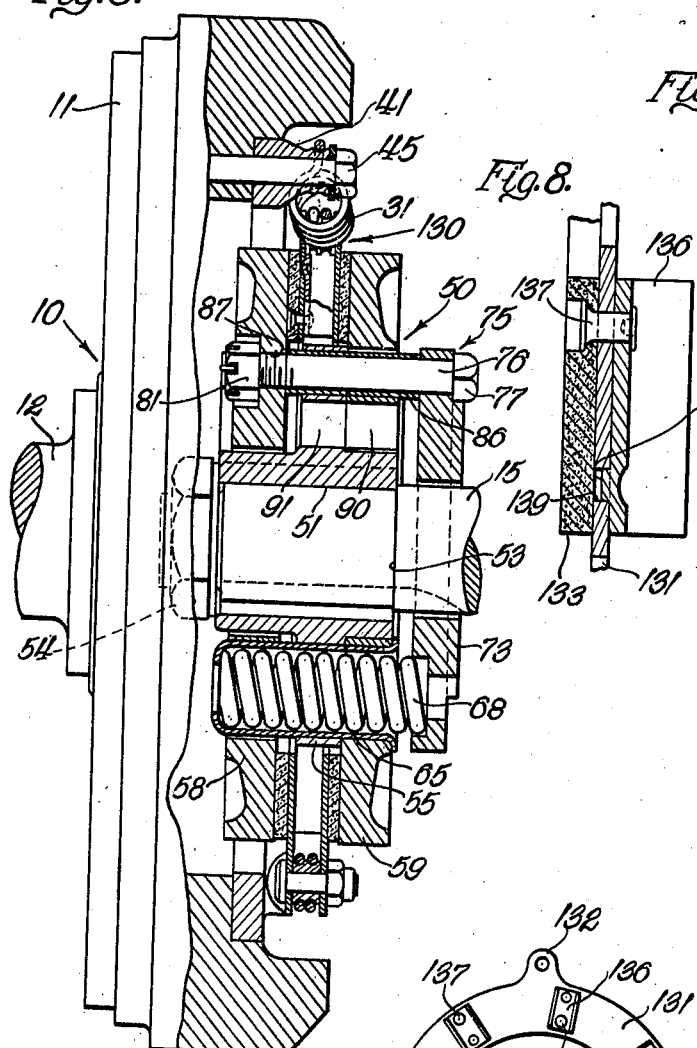
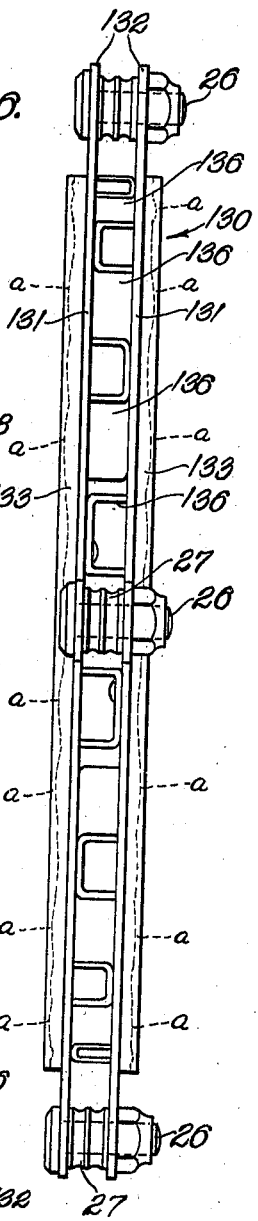
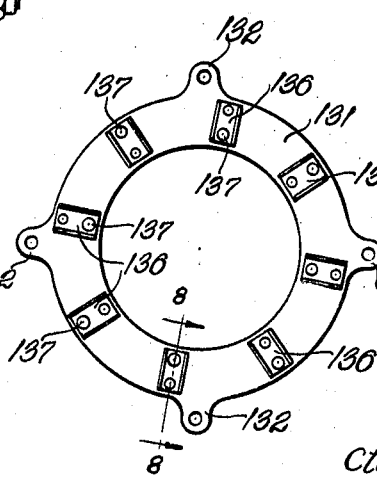
Inventor
Clarence M. Eason
By Brown, Jackson, Boettcher & Dienner
Attys Patented Dec. 26, 1939

2,184,506

UNITED STATES PATENT OFFICE 2,184,506

CLUTCH

Clarence M. Eason, Waukesha, Wis., assignor to Industrial Clutch Company, Waukesha, Wis., a corporation of Wisconsin Application March 25, 1937, Serial No. 132,985

17 Claims. (Cl. 192—68)

The present invention relates generally to clutches, and more particularly to clutches that are especially designed to accommodate axial, radial, and angular displacement between the driving and driven parts.

The principal object of the present invention is the provision of a clutch structure in which the driving clutch plate is connected to the driving part, such as a flywheel, by means of opposed pairs of springs arranged tangentially of the driving clutch plate and connected at their inner ends to the latter and at their outer ends to the driving part, such as the aforesaid flywheel. Another object of the present invention is to arrange these springs under a certain amount of initial preloading, and a further object of the present invention is to arrange the points of connection between the springs and the driving plate and flywheel so that there is a component of force tending to free the driving clutch plate from any contact with the driven clutch members when the clutch is released. One of the advantages in arranging the torque transmitting springs tangentially is that the springs are capable of exerting their greatest force in the direction in which the torque is transmitted from the flywheel to the driving clutch plate. That is, the springs of each pair are arranged coaxially and are attached to the driving clutch plate in such manner that the axis of the springs is tangent to the driving clutch plate at the point of attachment of the springs to the plate. A further advantage of this construction and arrangement is that the springs can transmit substantial amounts of torque and, at the same time, can accommodate a considerable amount of displacement both angularly and radially between the axes of the driving and driven parts.

Another important object of the present invention is the provision of a novel form of disc clutch in which the single clutch plate and the two oppositely disposed plates are formed of the same material, preferably cast iron or other material having the required friction characteristics, and the use between said plates of friction rings that are loose and are not riveted or otherwise attached to any of the clutch plates.

Another object of the present invention is the provision of a novel form of clutch plate that is built up of two relatively thin metallic discs and held spaced apart by bridges or spacers that are separated sufficiently in a peripheral direction to permit a slight yielding of the discs between the spacers, thereby providing a soft clutch. A further object of the present invention in this connection is the provision of improved air circulating means for a clutch in which a movement of air occurs radially outwardly between the spaced discs of the driving clutch structure. A still further object of the present invention in this connection is to construct the aforesaid clutch plate as two identical units; each unit consisting of a clutch disc and spacers secured thereto, preferably by the same rivets that fasten the friction lining to the outer face of the disc, and another object of the present invention is the provision of a driving clutch plate of this character having attaching lugs that are so related to the above-mentioned spacers that identical units may be used in fabricating the clutch and, at the same time, securing uniform spacing of the bridges or spacers in the driving clutch plate structure.

A further object of the present invention is the provision of a clutch having certain of the above-mentioned features and embodying conical engaging surfaces.

An additional object of the present invention is the provision of a clutch embodying a driven clutch hub having a flange and a pair of loosely mounted separate clutch plates disposed on opposite sides of the flange of said member, with means for causing all of the parts to rotate together, which means extends through registering openings in the flange and in said clutch plates.

These and other objects and advantages of the present invention will be apparent to those skilled in the art after a consideration of the following detailed description, taken in conjunction with the accompanying drawings illustrating the preferred structural embodiments.

Referring now to the drawings:

Figure 5 is a section, also similar to Figure 3, showing another form of the present invention;

Figure 6 is an edge view at an enlarged scale of the driving clutch plate member employed in the construction shown in Figure 5;

Figure 7 is a side view of one of the two identical discs employed in fabricating the driving clutch member shown in Figure 6, Figure 7 being at a reduced scale and showing the spacing and arrangement of the bridging spacers; and Figure 8 is an enlarged section taken along the line 8—8 of Figure 7.

Figure 1:
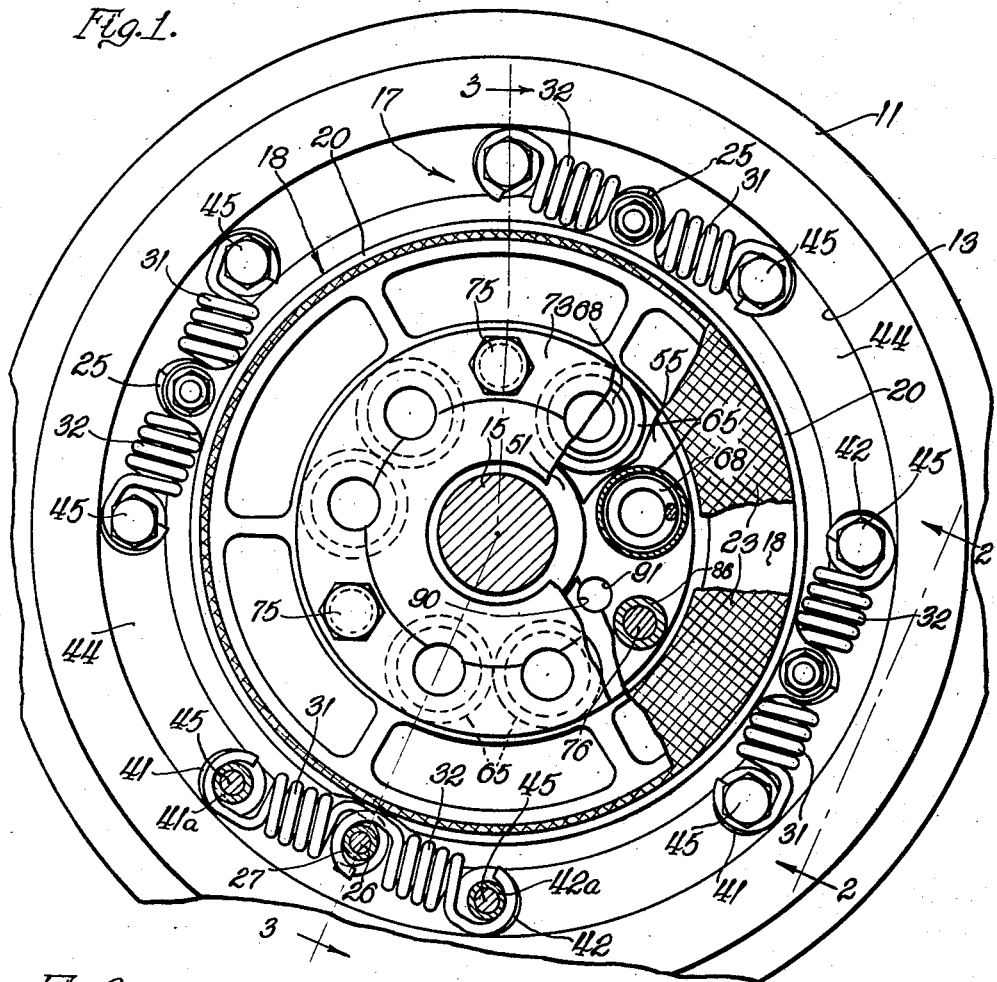
Figure 1 is an end view of a clutch embodying the principles of the present invention.
Figure 2:
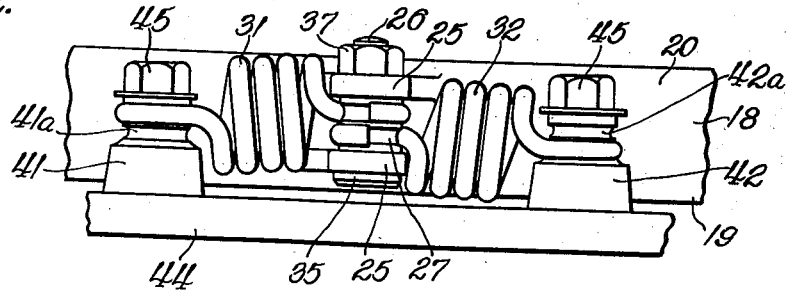
Figure 2 is a fragmentary view taken at an enlarged scale along the line 2—2 of Figure 1.
Figure 3:
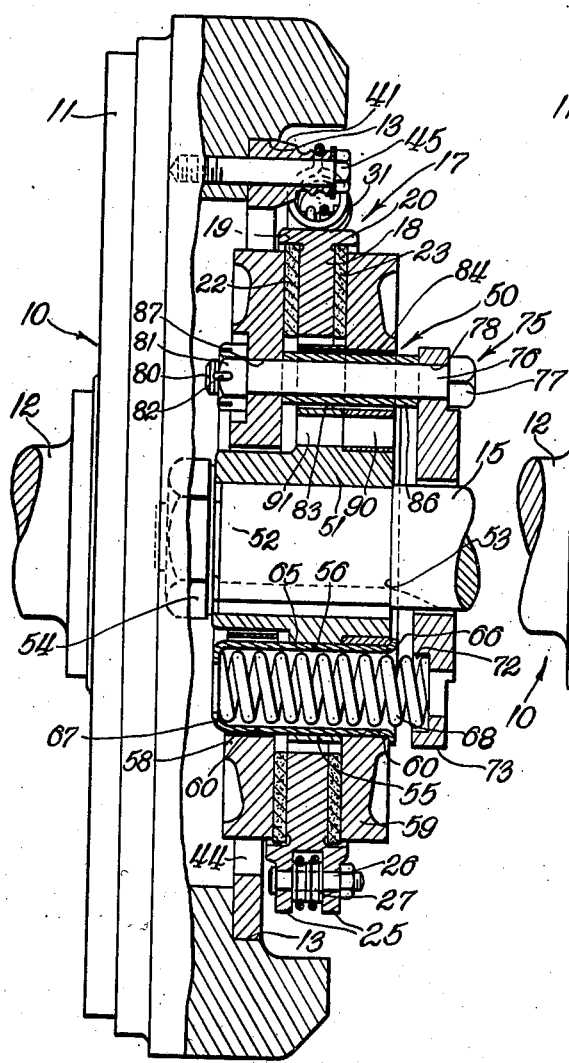
Figure 3 is a section taken substantially along the line 3—3 of Figure 1.

Referring more particularly to Figures 1, 2 and 3, the reference numeral 10 indicates a driving element or part in the form of a flywheel 11 bolted or otherwise secured to the crank shaft 12 of a motor. The flywheel 11 may be of any suitable form, but preferably is of the type that is provided with a peripheral recess 13 which will be referred to later. A driven element or part in the form of a shaft 15 is disposed in coaxial relation with respect to the crank shaft 12, and the driven shaft 15 is normally held against axial displacement by any suitable means, usually associated with the clutch housing (not shown). It is one of the principal objects of the present invention to provide a clutch structure connecting the driving and driven shafts 12 and 15 in such a manner that axial, radial, and angular misalignment can be accommodated without causing excessive wear in the clutch.

The driving member of the clutch is indicated in its entirety by the reference numeral 17 and comprises a driving clutch disc or plate 18 which is preferably formed of cast iron and is provided with oppositely directed flanges 19 and 20 (Figure 3). Friction rings 22 and 23 are loosely disposed on opposite sides of the driving clutch plate 18, and the rings 22 and 23, which are not riveted or attached in any manner to the clutch plate 18, have an outer diameter which is substantially the same as the internal diameter of the flanged sections 19 and 20, so that when the rings are seated on opposite sides of the clutch plate 18 they are held against any radial displacement relative to the clutch plate 18.

The driving clutch plate 18 is yieldingly connected to the flywheel 11 in torque transmitting relation by means that comprises a plurality of tangentially disposed springs and an anchoring ring to which the springs are connected and which is bolted or otherwise fastened in any suitable manner to the flywheel 11. The driving clutch plate 18 is formed with a plurality of pairs of apertured ears or lugs 25, as best shown in Figures 2 and 3. Preferably, but not necessarily, the lugs or ears 25 are formed integrally with the clutch plate 18. A pin 26 is passed through the openings in the ears 25 of each pair, and mounted on each pin and in between the ears is a double grooved roller, or a pair of grooved rollers 27 around which the inner ends of a pair of tension springs 31 and 32 are disposed, as best shown in Figure 2. The pin 26 may take any suitable form, such as a straight pin or stud that is riveted over at the ends to hold the pin in position, but preferably, and as shown in Figure 2, the pin 26 has a head 35 on the inner end and is firmly fastened in place by a nut 37 at the other end.

As best shown in Figure 1, the inner ends of the springs 31 and 32 of each pair are curved or bent in the form of a hook about an axis so as to form arcuate sections which have a diameter appreciably greater than the diameter of the grooved roller or rollers 27 over which the curved ends of the springs are engaged. This is for the purpose of providing for a rolling action between the spring and its anchoring connection to the driving clutch plate 18. The outer ends of the springs 31 and 32 are connected, respectively, to lugs 41 and 42, which constitute a pair of lugs between which the clutch plate lugs 25 are disposed, secured to an attaching ring 44 that is adapted to seat in the flywheel recess 13. The lugs 41 and 42 are apertured (Figure 3) to accommodate attaching bolts 45 by which the ring 44 may be secured to the flywheel. As best indicated in Figure 1, there are four sets of clutch plate lugs 25, four pairs of springs, 31, 32, and four pairs of attaching lugs 41, 42, but it will be obvious that a greater or a lesser number may be employed, as desired. The springs 31 and 32 are arranged to extend oppositely from the attaching bushing 27 with their axes in substantial alignment and arranged tangentially with respect to the driving clutch plate 18, the axis of each pair of springs being disposed at right angles to a line extending from the axis of rotation of the driven shaft 15 radially outwardly through the ears 25, whereby the springs 31 and 32 act in the direction of their length in transmitting rotation from the flywheel to the driving clutch plate 18, but any angular or radial displacement between the driving and driven shafts 12 and 15 is accommodated readily by the springs 31 and 32 yielding to permit the displacement of the driving clutch plate 18 relative to the flywheel 11. The outer ends of the springs 31 and 32 are bent in a curve which is substantially the same as the inner ends, and the spring receiving portions of the attaching lugs 41 and 42 have grooved sections 41a and 42a which are of smaller diameter than the diameter of the arcuate outer ends of the springs 31 and 32, thereby providing for a rolling action between the outer ends of the springs and the grooved sections 41a and 42a as the points of connection between the inner ends of the springs with the driving clutch member move away from a straight line joining the lugs 41 and 42 of each pair. Due to the aligned relation of the springs 31 and 32 of each pair, displacement of the driving clutch plate in a direction normal to the axis of the springs 31 and 32 meets with a minimum resistance by the springs.

The driven member of the clutch is indicated in its entirety by the reference numeral 50 and comprises a flanged clutch hub, a pair of loosely mounted driven clutch plates, and spring means for urging said driven plates toward one another to clamp the driving clutch plate 18 therebetween. The clutch hub is indicated at 51 and is mounted on a reduced end 52 of the driven shaft 15 up against a shoulder 53. The hub 51 is held in place by a nut 54 or the equivalent. A flange 55 is formed on or carried by the clutch hub 51 and is provided with a plurality of openings 56 therein. Disposed on opposite sides of the flange 55 is a pair of clutch plates 58 and 59 and each of these plates has an opening 60 formed therein of substantially the same diameter and adapted to register with the openings 56 formed in the flange 55 of the clutch hub 51. The driven clutch plates 58 and 59 are loosely mounted so as to be capable of axial movement relative to the clutch hub 51. A plurality of spring receiving cups or sleeves 65 are disposed in the registering openings 56 and 60, preferably the cups or sleeves 65 being arranged in pairs as indicated in Figure 1. Each cup has a flange 66 that is adapted to seat against the edge of the opening 60 in the outer driven clutch plate 59, and the opposite end 67 of each spring-receiving cup or sleeve 65 is formed with an inturned flange to serve as a seat for the spring 68 that is disposed in the cup 65. It will be observed that the spring-receiving cups 65 fit snugly in the openings 56 and 60 and thereby serve as keys or studs for causing both of the driven clutch plates 58 and 59 to rotate with the clutch hub 51 at all times. The cups 65 also serve to guide the plates 58 and 59 when and if they shift axially relative to the hub 51. The outer ends of the springs 68 opposite the ends that seat against the ends 67 of the cups 65 are received in recesses 72 formed in the inner face of a shift ring 73 that is disposed about the driven shaft 15 and is movable axially thereof. In the form of the invention shown, the inner clutch plate 58 is the one that is normally shifted toward and away from the other clutch plate 59 to provide for engagement and disengagement of the clutch. The inner clutch plate 58 is connected with the outwardly disposed shift ring 73 by a tie-bolt construction that is indicated in its entirety by the reference numeral 75. Such construction consists of a bolt 76 having a head 77. The bolt 76 is received in an opening 78 formed in the shift ring 73, and the opposite end 80 of the bolt 76 is threaded and receives a nut 81 and a cotter key 82. In addition to the openings 56, the flange 55 of the clutch hub 51 carries another set of openings 83, and similarly the outer driven clutch plate 59 is provided with a set of openings 84 that register with the openings 83. The bolt 76 is provided with a spacing sleeve 86 that passes through the openings 83 and 84 and engages the driven clutch plate 58 and the shift ring 73 to hold these members in spaced relation. As many tie-bolts 75 may be provided as desired, but as best shown in Figure 1, I provide three. The shiftable clutch plate 58 has a set of openings 87 to receive the inner ends of the bolts 76. It will be observed that the tie-bolt means 75 cooperate with the spring-receiving cups 65 in accommodating the relative axial movement between the driven clutch plates and the clutch hub 51, and that one end of each of the springs 68 is connected to the clutch plate or disc 59 through the flanged cup or sleeve 65 and that the other end of each spring is connected to the other clutch plate 58 through the shift ring 73 and the bolts 76. The clutch plates 58 and 59 are formed of the same material as the driving clutch plate 18, which is preferably cast iron, so as to have substantially the same friction characteristics as the clutch plate member 18, whereby it is not necessary to have the friction lining members 22 and 23 fastened to any of the clutch plates.

Any suitable form of shifting mechanism may be associated with the shift ring 73. The force of the springs 68 is applied to the inner end of the spring cups 65 and against the shift ring 73, whereby the springs 68 exert a constant force tending to move the shiftable clutch plate 58 toward the other driven clutch plate 59, thereby acting to clamp the driving clutch plate 18 and the friction rings 22 and 23 therebetween.

Cooling of the clutch, in the form of the invention shown in Figures 1 and 3, is accomplished by means of a third set of openings 90 formed in the radially inner portion of the outer driven clutch plate 59 and a set of openings 91 registering therewith and formed in the flange 55 of the clutch hub 51. As the clutch is operated, air is drawn in through the openings 90 and 91 into thermal contact with the driving clutch plate 18 and the friction rings 22 and 23.

An important feature of the present invention relates to the use of the tangentially disposed springs 31 and 32 in shifting the driving clutch plate 18 away from the driven clutch plate 59 when the shiftable clutch plate 58 is moved inwardly (to the left as viewed in Figure 3) to release the clutch. To this end, the points of connection of the outer ends of the springs 31 and 32 are disposed generally in a plane that is spaced inwardly of the plane that contains the points of connection between the inner ends of the springs and the driving plate ears 25. As a result of this arrangement, when the clutch shifting means is actuated to permit the springs 68 to expand and force the shiftable clutch plate 58 toward the other driven clutch plate 59, the springs 31 and 32 are deflected slightly out of a true aligned position and into an angled position indicated in Fig. 2. Now when the shiftable clutch plate 58 is moved inwardly, the initial tension or preloading of the springs 31 and 32 exerts a component of force acting to shift the driving clutch plate 18 inwardly (downwardly as viewed in Figure 2) so as to move the driving clutch plate 18 away from the driven clutch plate 59, thus freeing the friction ring 23 of any contact which might cause the clutch to drag. When the clutch is disengaged, the springs 31 and 32 straighten out into an essentially aligned position from the position indicated in Figure 2. The axial alignment of the springs 31 and 32 of each pair is not geometrically perfect, because it is necessary to have the inner ends of the springs overlap where they engage the double grooved bushing 27, but for all practical purposes, when the clutch is released the tangential springs 31 and 32 are in substantially axial alignment. Preferably, the grooves 27, 41a and 42a, are arranged to provide a rolling action within the limits of the axial movement experienced by the driving clutch plate 18, not only in the engaging and releasing of the clutch but also in the accommodation of angular misalignment of the driving and driven shafts 12 and 15 relative to each other. This rolling action is, of course, in a direction at right angles to the rolling action occasioned by the radial displacement of the driving clutch plate 18 relative to the points at which the outer ends of the springs 31 and 32 are anchored to the flywheel 11.

Reference is made above to the fact that the driving and driven clutch plates 18, 58 and 59 are formed of the same material, preferably cast iron, and that both of the driven clutch plates 58 and 59 are loosely mounted with respect to the clutch hub 51 on opposite sides of the flange 55 of which these plates 58 and 59 are disposed. Normally, the clutch plate 59 does not move relative to the clutch hub 51, but by having these parts separate, the clutch hub 51 can be formed as a forging, or in any other manner to provide the necessary strength, while the clutch plate 59 can be formed of cast iron to provide the desired frictional characteristics for association with the driving clutch plate 18 and the shiftable clutch plate 58.

Figure 4:
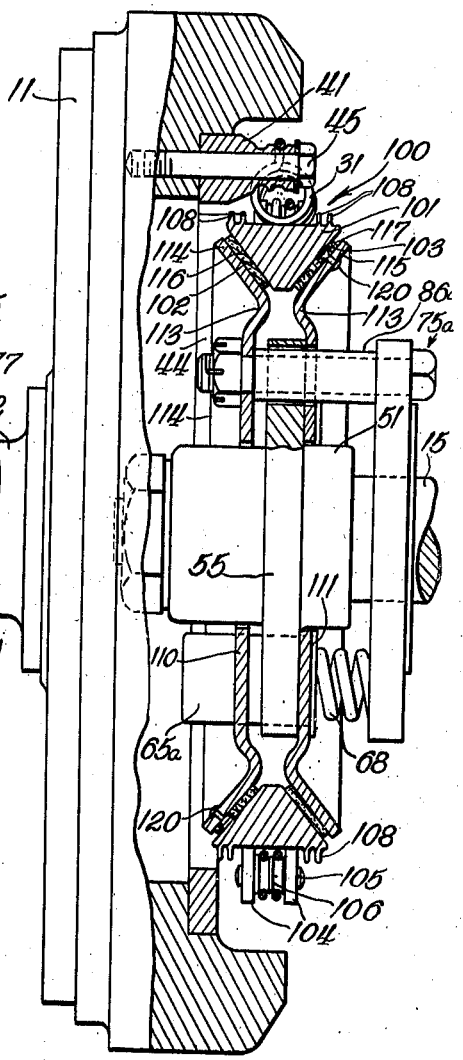
Figure 4 is a section, similar to Figure 3, showing a modified form of the present invention.

The form of the invention shown in Figure 4 is quite similar to the structure described above, the principal difference being that the driving clutch member is in the form of a double cone ring, and the driven clutch plates are of complementary conical formation and are of pressed metal, sheet steel or the like, having the friction lining riveted or otherwise fastened thereto.

Referring now particularly to Figure 4, the driving clutch member is indicated in its entirety by the reference numeral 100 and includes a double cone ring 101 having inner and outer conical friction surfaces 102 and 103. The member 101 is provided with pairs of spring receiving ears or lugs 104, and the lugs or ears are apertured to receive pins 105 upon each of which a double grooved bushing 106 is mounted. The bushing 106 is substantially the same as the double grooved bushing shown in Figure 3. The tangentially disposed springs which connect the driving clutch member 101 to the flywheel 11 are substantially the same as the spring construction described above, and hence the same reference numerals have been applied in Figure 4. The driving clutch ring 101 is provided with a number of peripheral cooling ribs 108.

The driven plates of the clutch are indicated at 110 and 111, and each consists of a pressed steel or similar disc having radially inner openings accommodating the spring receiving cups 65a and the spacing sleeves 86a of the several tie-bolt structures 75a. These latter parts are similar to the construction described above for the tie-bolt means 75, but the tie-bolts 75a are somewhat shorter than the corresponding structure shown in Figure 3. The radially outer or peripheral portion of the driven clutch discs or plates 110 and 111 are beaded or flanged, as at 113, to give strength to the parts and are formed with sections 114 and 115 that are flared so as to correspond to the conical friction surfaces 102 and 103 on the driving member 101. Friction lining rings 116 and 117 are riveted, as at 120, to the respective driven clutch plates 110 and 111.

In Figures 5, 6 and 7 I have shown a form of the present invention in which the driving clutch plate is formed as a pair of spaced discs formed of sheet steel or the like and having the friction rings riveted to the outer faces of the discs. Referring now to Figures 5 and 6, it will be observed that the construction of the driven clutch plates and associated spring shifting mechanisms is practically identical with the construction shown in Figure 3 and described above. Hence, like parts in Figure 5 have been indicated by the same reference numerals employed in Figure 3. Similarly, the spring construction connecting the driving clutch plate with the flywheel 11 is substantially the same in Figure 5 as in Figure 3.

The driving clutch plate structure connected to the flywheel 11 by the spring structure shown in Figure 1 and adapted to be clamped between the driven clutch plates 58 and 59 shown in Figure 3, is indicated by the reference numeral 130 and comprises a pair of identical discs 131 having apertured ears 132 and friction rings 133 riveted on the outer faces thereof, as will be described below. Each clutch disc 131 carries a plurality of U-shaped bridges or spacing members 136, and as best indicated in Figure 8, the spacers are riveted to the side of the associated disc 131 opposite the face against which the friction ring 133 is disposed. By virtue of this construction, the same rivet, indicated at 137, can be utilized for fastening the lining 133 in place and also holding the bridges or spacers 136 in position. As indicated in Figure 7, the rivets 137 are staggered, which is conventional practice so far as fastening the clutch lining to the clutch disc is concerned, and according to the present invention the rivets 137 are disposed adjacent one end of the spacers. At the other end the spacer has a section 138 projected into an opening 139 that is formed in the disc 131 before the friction ring or lining 133 is applied. This serves to keep the spacer 136 from turning about the rivet, and the latter holds the spacer, together with the lining 133, firmly to the clutch disc 131.

The clutch disc ears 132 are apertured to receive the grooved spring bushings or rollers 27 and the bolt means 26 upon which they are mounted, as described above in connection with Figures 1 and 2.

The backs or intermediate portions of the spacers 136 are fastened to the associated clutch disc, which leaves the upturned portions extending substantially in radial planes at right angles to the plane of the disc 131. The driving clutch structure 130 is made up of two identical discs of the type just described, and the spacing of the bridging members 136 about the discs 131 is such that when two of the discs are brought together with their apertured ears 132 in a position to receive the bolts 26, the spacers or bridges 136 are spaced equally apart circumferentially of the two assembled clutch discs 131. In order to bring this about, each disc 131 has its spacers 136 separated by equal distances and, in addition, so spaced with reference to the ears 132 that the distance between the axis of a spacer 136 and a radius passing through the ear 132 is equal to one half the spacing between adjacent spacing members when the clutch structure 130 is assembled and fastened together in the manner indicated in Figure 6.

A driving plate structure of this character has several important advantages. In the first place, it is light in weight, and in the second place, when a driving clutch plate of this character is employed the clutch temperatures are kept down to a minimum, due to the action of the spacers 136 in not only conducting heat away from the discs 131 but, in addition, serving as vanes for drawing air in through the openings 90 and 91 (Figure 5) and directing the same through the clutch in between the discs 131 and radially outwardly under the action of centrifugal force. Another important feature of the present invention in this connection lies in the ability of the discs 131 in between the spacers 136 to flex slightly under the stresses involved in transmitting torque. Looking particularly at Figure 6, it will be observed that the friction rings 133 are spaced apart rigidly where the spacers 136 lie, but are unsupported, except for the discs 131, in between the spacers. As a result of this arrangement, the friction lining 133 wears slightly more at the aforesaid points of rigid connection than at the points between the spacers 136. This leaves a plurality of high points as the friction linings wear, approximately as indicated in dotted lines at a in Figure 6. When the clutch is released the resiliency of the discs 131 causes these high points a to spring outwardly, and when the clutch is reengaged these points a first engage the driven clutch plates before the clutch comes into full engagement at the more solid portions of the driving clutch plate. A clutch of this construction gives a very soft engagement.

While I have shown and described above the preferred form of my invention, it will be apparent to those skilled in the art that the present invention is not to be limited to the particular details shown and described but that, in fact, widely different means may be employed in the practice of the broader aspects of my invention.

What I claim, therefore, and desire to secure by Letters Patent is:

1. A clutch adapted to connect driving and driven parts, comprising a clutch member, tangentially disposed resilient elements yieldingly connecting said clutch member with one of said parts, and a companion clutch member carried by the other of said driving and driven parts and adapted to be engaged with said first clutch member, all of the points of attachment of said resilient elements with said first clutch member being spaced in the same direction to one side of the points of attachment of the resilient elements with said one part, whereby said resilient elements are adapted to exert a force acting to move the first clutch member away from the companion clutch member.

2. A clutch adapted to connect driving and driven parts, comprising a clutch member, pairs of axially aligned springs connected at their inner ends to said clutch member and at their outer ends to said driving part, said springs being disposed generally tangentially with respect to said clutch member and acting axially in the direction of their greatest strength for transmitting torque between said member and said driving part, said springs yielding in the direction of their minimum resistance to displacement, generally normal to their aligned tangentially disposed axes, to accommodate relative movement, other than rotation, between the clutch member and said driving part, and a companion clutch member carried by said driven part and adapted to be engaged with said first clutch member.

3. A clutch adapted to connect driving and driven parts, comprising a clutch member, pairs of tangentially disposed springs connected at their inner ends to said clutch member and at their outer ends to one of said parts, such springs acting in the direction of their axes and generally tangentially with respect to said clutch member for transmitting torque between said member and said one part, said springs yielding in a direction generally normal to their tangentially disposed axes to accommodate relative movement other than rotation between the clutch member and said one part, and a companion clutch member carried by the other of said driving and driven parts and adapted to be engaged with said first clutch member, the points of attachment of the outer ends of said pairs of springs to said one part all lying substantially in the same plane and spaced from the plane containing the points of attachment of the springs to said clutch member when the clutch is engaged.

4. A disc clutch adapted to connect driving and driven parts, comprising a plate member connected to one of said parts and held against axial displacement with respect thereto, a second plate member shiftable axially relative to said one part, a clutch disc member disposed between said clutch plates, a plurality of tangentially disposed springs arranged in pairs, the inner ends of the springs of each pair being connected to said clutch disc member and the outer ends of said springs being connected to the other of said driving and driven parts, the points of connections at the ends of said springs lying in substantially the same plane and said plane being disposed substantially midway between said plate members when the latter are separated and out of contact with said clutch disc member.

5. A clutch adapted to connect driving and driven parts, comprising a central clutch plate, a pair of driven clutch members disposed on opposite sides of said clutch plate and adapted to clamp the latter therebetween, lugs extending radially outwardly from said clutch plate, an axially directed pin carried in each lug, a pair of tangentially disposed tension springs having their inner ends engaged over the pin for each lug, and means fastening the outer ends of the springs of each pair to said driving part, said springs permitting the clutch plate to shift in any direction relative to said driving part while in torque transmitting relation.

6. In a clutch, the combination of a driving clutch plate, a driven clutch member including a flanged hub and a pair of clutch plates disposed on opposite sides of said driving clutch plate and the flange on said clutch hub and separate from and movable with respect to the latter, and spring means acting against one of said clutch plates and reacting against the other so as to urge one of the clutch plates toward the other to clamp the driving clutch plate therebetween.

7. In a disc clutch, a pair of disc members, each of said members having a plurality of openings therein, a driven part including a flanged member the flange of which is also provided with a plurality of openings arranged to register with the openings in said disc members, axially directed sleeves seated in certain of the openings in one of said disc members and extending into the openings in said flanged member and into the openings in the other disc member and arranged to accommodate relative axial movement between said pair of disc members and to cause the latter to rotate with said driven part, and spring means seated in said sleeves and connected with said other disc member and urging said other disc member for movement toward said one disc member.

8. In a disc clutch adapted to connect driving and driven parts, the combination of a clutch plate connected with one of said parts, a flanged member carried by the other of said parts, the flange of said member having a plurality of openings therein, a pair of disc members disposed on opposite sides of said flange and said clutch plate, said disc members each having openings adapted to register with the openings in said flange, and spring receiving cups seated in said openings and arranged to accommodate relative axial movement of said pair of disc members and adapted to cause said disc members to rotate with said flanged member.

9. A disc clutch adapted to connect driving and driven elements, comprising a driving clutch plate operatively connected to one of said parts, a flanged member fixed to the other of said parts, a pair of clutch plates disposed on opposite sides of said first mentioned clutch plate and on opposite sides of the flange of said fixed member, registering openings formed in said flange and in said oppositely disposed clutch plates, spring receiving cups disposed in said registering openings and reacting against one of said oppositely disposed clutch plates, said cups serving to cause said oppositely disposed clutch plates to rotate with said flanged member, springs seated in said cups, a shift ring receiving the reaction of said springs, and means operatively connecting said shift ring to the other of said oppositely disposed clutch plates.

10. A clutch comprising, in combination, a driving clutch plate consisting of a pair of discs having a plurality of apertured ears, spacing means maintaining said discs in spaced-apart relation and means passing through said apertured ears for fastening said discs together in said spaced-apart relation, a pair of clutch plates disposed on opposite sides of said first-mentioned clutch plate and adapted to clamp the latter therebetween, a plurality of springs having ends disposed between the ears of said clutch discs and connected with the means that fasten said clutch discs together, and driving means connected with the other ends of said springs.

11. A clutch plate comprising a pair of relatively thin plates having some resiliency, a plurality of spacers rigidly connected between said plates for maintaining the latter in spaced relation, said spacers being separated sufficiently far apart so that the plates yield slightly at points between said spacers, and non-metallic friction lining secured to the outer faces of said plates, said lining being sufficiently soft to wear to a greater extent at the portions adjacent said rigid spacers, leaving high points between said spacers.

12. A clutch adapted to connect driving and driven parts, comprising a driving clutch plate consisting of a pair of relatively thin clutch discs, generally radially directed U-shaped bridges maintaining said discs in spaced-apart relation and friction lining fastened to the outer surfaces of said discs, means connecting said driving clutch plate to said driving part, and a pair of relatively movable driven clutch plates connected with said driven part and adapted to clamp said driving clutch plate in driving relation with respect to said driven part, at least one of said driven clutch plates having one or more air openings therein to provide for circulation of air through said openings and radially outwardly between said clutch discs when the clutch rotates.

13. A clutch comprising a cast iron driving clutch member having generally radially facing opposite conical clutch surfaces, a pair of pressed metal clutch members having conical peripheral sections disposed on opposite sides of and adapted to engage said conical clutch surfaces on said driving clutch member, a driven member having a flange disposed between said pair of clutch members, said flange and said last named members having registering openings, flanged sleeve members disposed in said registering openings with the flanges thereof serving to hold one of said pressed metal clutch members against the flange on said driven member, the other pressed metal clutch member being shiftable axially of said sleeves, and biasing spring means seated in said sleeves and acting against said pressed metal clutch members for closing them to frictionally engage the conical clutch surfaces of said driving clutch member.

14. A disc clutch adapted to connect driving and driven parts, comprising a plate member connected to one of said parts and held against axial displacement with respect thereto, a second plate member shiftable axially relative to said one part, a clutch disc member disposed between said clutch plates, a plurality of springs arranged with the inner end of each connected to said clutch disc member and the outer ends of said springs being connected to the other of said driving and driven parts, the points of connections at the outer ends of said springs being disposed so that said springs exert a force acting to move the disc member axially away from said first plate member when the clutch is disengaged.

15. A clutch adapted to connect driving and driven parts, comprising a driving clutch plate consisting of a pair of relatively thin clutch discs, means maintaining said discs in spaced-apart relation and friction lining fastened to the outer surfaces of said discs, means connecting said driving clutch plate to said driving part, and a pair of relatively movable driven clutch plates connected with said driven part and adapted to clamp said driving clutch plate in driving relation with respect to said driven part, at least one of said driven clutch plates having one or more air openings therein to provide for circulation of air through said openings and radially outwardly between said clutch discs when the clutch rotates.

16. A clutch plate comprising a pair of relatively thin plates, each of said plates having one or more apertured attaching ears, a plurality of spacers secured to each disc, each plate and attached spacers being identical and said spacers being arranged on each of said plates relative to the attaching ears so that when the plates are brought together with the spacers on one plate disposed between the spacers on the other plate, the apertures in said attaching lugs are aligned.

17. A clutch plate comprising a pair of spaced apart relatively thin resilient plates having smooth outer surfaces, a plurality of spacers disposed between and separate from said plates for maintaining the latter in spaced relation, the spacers being fixed to said plates at points sufficiently spaced apart so that the plates yield between said spacers, and non-metallic friction lining secured to the smooth outer surfaces of said plates, the lining wearing to a lesser extent between said spacers, due to the aforesaid yielding of said plates, and causing high points which produce soft engagement.

CLARENCE M. EASON.